United States Patent [19]

Ishida et al.

[11] 4,297,216

[45] * Oct. 27, 1981

[54] METHOD FOR TREATMENT OF BIOCHEMICAL WASTE

[75] Inventors: Masahiko Ishida; Ryooichi Haga; Youji Odawara, all of Hitachi, Japan

[73] Assignee: Hitachi, Ltd., Tokyo, Japan

[*] Notice: The portion of the term of this patent subsequent to Jan. 10, 1997, has been disclaimed.

[21] Appl. No.: 867,361

[22] Filed: Jan. 5, 1978

Related U.S. Application Data

[63] Continuation of Ser. No. 651,586, Jan. 22, 1976, abandoned.

[30] Foreign Application Priority Data

Jan. 22, 1975 [JP] Japan ................................. 50/8729

[51] Int. Cl.$^3$ ............................................. C02F 11/04
[52] U.S. Cl. ................................. 210/613; 48/197 A; 71/10; 210/603; 210/631

[58] Field of Search ................... 48/197 A; 71/10–14; 210/2–10, 12, 16, 18, 51, 56; 435/167

[56] References Cited

U.S. PATENT DOCUMENTS

| | | | |
|---|---|---|---|
| 1,963,581 | 6/1934 | Heukelekian | 210/12 |
| 1,997,252 | 4/1935 | Fischer | 71/10 |
| 3,105,041 | 9/1963 | Genter et al. | 210/6 |
| 3,459,659 | 8/1969 | Bedker | 210/12 |
| 3,649,534 | 3/1972 | Schotte | 210/63 R |
| 3,772,191 | 11/1973 | Thorn | 210/10 |
| 3,959,125 | 5/1976 | Teletzke | 210/10 |
| 4,067,801 | 1/1978 | Ishida et al. | 210/5 |

Primary Examiner—Peter A. Hruskoci
Attorney, Agent, or Firm—Thomas E. Beall, Jr.

[57] ABSTRACT

Method for treatment of biochemical waste which comprises adding acid to the biochemical waste to adjust pH (power of hydrogen ion) thereof, heating the adjusted biochemical waste, adding alkali thereto to neutralize the waste, and treating with anaerobic digestion.

8 Claims, 2 Drawing Figures

METHOD FOR TREATMENT OF BIOCHEMICAL WASTE

This is a continuation of application Ser. No. 651,586 filed Jan. 1, 1976, now abandoned.

BACKGROUND OF THE INVENTION

This invention relates to a method and a system for treatment of biochemical waste, and more particularly to an improvement of a method of anaerobic treatment of the biochemical waste.

Recently, in accordance with the spread of secondary treating facilities for sewage and waste-water sludge from stock breeding industry, a large amount of surplus activated sewage is continuously produced. In addition, garbage from the human life accumulates to a large amount.

The biochemical waste is mainly formed of the activated sewage and the garbage. Raw sewage contains organic material formed of fats, proteins, carbohydrates and microorganisms. Accordingly, it is very important to efficiently treat the biochemical waste which essentially consists of animal and plant cells and microorganisms.

The anaerobic digestion process has been popular in the waste treatment. It is characterized by the capability of treating large volumes of dilute organic slurries at low cost, because the produced gas can be used for motive power of treating facilities, the high kill rate of pathogenic organisms and the capability of producing solid residues suitable for use as soil conditioners.

Despite its many advantages, the anaerobic digestion process has not yet reached its full potential, because the anaerobic digestion process normally requires long terms such as 40 days for a low treatment efficiency. Therefore nowadays the anaerobic digestion process is not used vigorously.

If the rise of the treatment efficiency can be attained, the anaerobic digestion process is very useful for its many advantages. Various high speed digestion processes which can treat the biochemical waste in fourteen or fifteen days have been provided. But those processes unavoidably sacrifice their digestion rates. This means that those processes have advantages referring to a volume decrease of waste and a rise of dehydration, but they do not satisfy the requirements referring to the useful utilization of digestion gas and the level of BOD (biochemical oxygen demand) of the separated liquid.

The surplus activated sewage is treated by the anaerobic digestion process at a temperature of from 20° to 50 C. for long periods of time while the sewage is concentrated to about from 1 to 570 solids by a settling basin or a centrifuge. During the stay, sewage bacteria are gradually liquefied by the action of anaerobic bacteria to convert to methane gas through organic acid. The methane-producing bacteria are among strictly anaerobic organisms known.

It is well know among those people in this art that if during the stay the sewage in a state of slurry is not well stirred, the digestion remarkably delays and the removing rate of BOD becomes low.

General biochemical waste including surplus activated sewage is a kind of hydrophilic colloid and in a state of almost hydrated gel. Therefore, the sewage of solid density of 5% presents a state of paste and needs a large stirring power. Accordingly, actually the sewage of solid density up to about 5% only have been treated.

The need for improving anaerobic digestion technology is therefore greater now than ever before.

SUMMARY OF THE INVENTION

An object of the present invention is to provide an improved method for treatment of biochemical waste which have a high treatment efficiency and a high digestion rate.

Another object of the present invention is to provide an anaerobic process which enables to treat biochemical waste with a high solid density.

A further object of the present invention is to provide an economical anaerobic process which can make stirring power small.

The present invention provides a method for treatment of biochemical waste, comprising the steps of adding acid to the biochemical waste to adjust pH thereof below 3.5, heating the adjusted biochemical waste in a range of temperature between 60° and 200° C. for a predetermined time, adding alkali thereto to neutralize the wate, and treating with anaerobic digestion in a range of from the above mentioned temperature to a normal temperature. Upon the neutralization, it is not necessary to adjust pH to just 7. It is sufficient, if pH is in a range between 5 and 8.

These and other objects of the invention, as well as many of the attendant advantages thereof, will become more readily apparent when reference is made to the following description taken in conjunction with the accompanying drawing, in which.

DESCRIPTION OF PREFERRED EMBODIMENT OF THE INVENTION

In general in anaerobic digestion, organisms and animal and plant cell in raw slurry are liquefied by action of anaerobic bacteria and then converted to organic acid, which is converted to methane by action of methane-producing bacteria.

The anaerobic digestion gradually proceeds through the stay of from 20 to 40 days within a digestion tank. This invention is characterized in that the liquefying process consists of a heat treatment of biochemical waste under acidity. The heat treatment under acidity makes a digestion term short, gas production speed fast and an amount of gas production high. Furthermore, viscosity of biochemical waste remarkably becomes small by employing the heat treatment under acidity, so that the stirring power of a digestion tank is reduced or even biochemical waste of high density above 5% can be thrown out into the system. A pretreatment according to the invention consists of adding acid to the biochemical waste to adjust an effective range of pH below 3.5. Lower values of pH are desirable, but economically the range of pH preferably is between 1.0 and 3.0. Sulfuric acid and hydrochloric acid can be employed for acidifying the biochemical waste and organic acid such as acetic acid and citric acid also is useful. Economically sulfuric acid and hydrochloric acid are suitable and acid of high density is convenient for small dilution. An adding amount of acid is different in accordance with kinds of raw wastes, density and kinds of acids.

In general for forming the above mentioned effective range of pH, when hydrochloric acid of 35% is employed, an amount of the hydrochloric acid ranges between 0.1 and 1% (wt/wt).

When the biochemical waste is in a state of neutrality, there is very little decrease in viscosity as the temperature is raised until the temperature is raised over 150° C. When the biochemical waste is in a state of alkalinity, it would have an even greater viscosity and therefore be undsatisfactory.

It is necessary to continue to heat the biochemical waste over 60° C. and below 200° C. during at least one minute.

A treatment at conditions of excessive high temperatures and long terms, for example at 170° C. and during 20 minutes is not desirable because decomposed products which cause prevention of digestion appear at said conditions.

Thus the heat treatment preferably is at conditions under 160° C. and less than 10 minutes.

Figure 1:
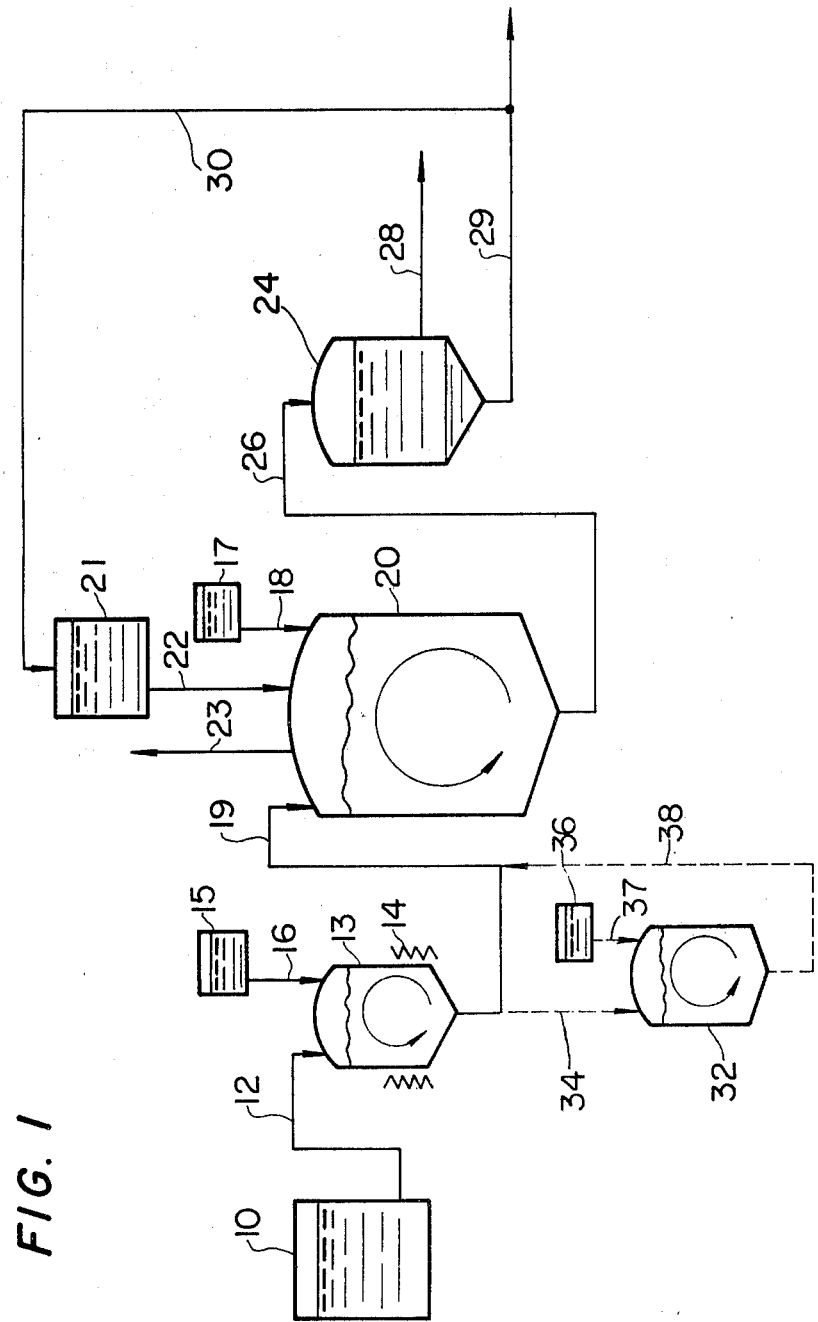
FIG. 1 is a schematic plan view of the invention, showing a biochemical waste treatment plant embodying the present invention.

FIG. 1 is a block diagram of the flow of biochemical waste through a system including the digester of the present invention. The raw waste can be collected in a settling tank 10 and transferred from the settling tank 10 to a pretreatment tank 13 provided with a heater 14 through a conduit 12 by techniques conventional in the art. Acid is added into the pretreatment tank 13 through a conduit 16 from an acid storage tank 15 to adjust pH of the water. The stirring is continued during heating for promoting its liquefaction.

The pretreated waste is transferred to a digestion tank 20 through a conduit 19. Alkali is added into the digestion tank 20 through a conduit 18 from an alkali storage tank 17 to neutralize the waste. After the neutralization, anaerobic sludge is added into the digestion tank as a seed for anaerobic digestion through a conduit 22 from an anaerobic sludge tank 21.

Anaerobic digestion is continued in the anaerobic environment, whereby digestion gas is produced and taken out through a conduit 23. The remainder is introduced into a digestion sludge separator 24 through a conduit 26. The remainder is separated in the separator 24 into liquid and digestion sludge. The separated liquid is taken out from a conduit 28 and the digestion sludge is taken out from a conduit 29. One part of the digestion sludge is returned into the anaerobic digestion sludge tank 21 through a conduit 30, so that the recycling of the digestion sludge is formed.

The waste from the pretreatment tank 14 may be introduced into a liquefying tank 32 through a conduit 34 shown by a dotted line instead of directly into tank 20. Alkali from a storage tank 36 may be added into the liquefying tank 32 through a conduit 37 to adjust pH of the waste. After the liquefying the waste is returned to the conduit 19 through a conduit 38 shown by dotted line. With such a variation, tank 17 and conduit 18 would be eliminated.

EXAMPLE 1

Figure 2:
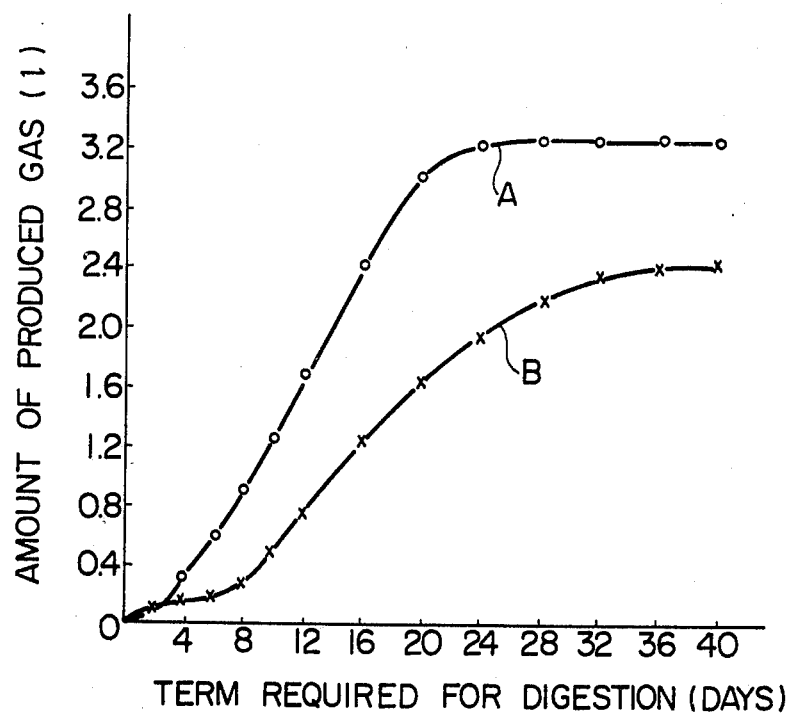
FIG. 2 is a set of curves comparing a digestion effect of a prior art and a digestion effect operated in accordance with the invention, when the invention is applied to surplus activated sewage.

Hydrochloric acid of 2.4 ml, of which density was 35%, was added to surplus activated sludge of 500 g which was remainder of an urban sewage treatment. The solid density of the sludge was 1.5% (wt/wt) and the content of organic material was 62% (wt/wt). The sludge was stirred. Thus, the pH of the sludge was adjusted to 2.0. The sludge was introduced into a stainless beaker and heated at 95° C. for five minutes. After heating, sodium hydroxide of 5 g, of which density was 30%, was added to the sludge so that pH of the sludge was adjusted to 6.9. The adjusted sludge was introduced into a digestion tank and anaerobic digestion sludge of 2 g consisting of excrement was added into the tank as a seed sludge. Gas within a chamber of the tank was replaced by $N_2$ gas. While the adjusted sludge was stirred between 150 and 200 rpm, the anaerobic digestion was continued at 20° C. FIG. 2 shows the result of the anaerobic digestion treatment. In comparison with the result, a result of another identical anaerobic digestion treatment without the pretreatment of the adding acid, the heating and the neutralizing is also shown in FIG. 2. A and B show the processes with and without the pretreatment respectively. The axis of ordinate shows an amount of produced digestion gas and the axis of abscissa shows digestion days.

It may be obviously understood that the anaerobic digestion treatment with the pretreatment makes the liquefying term of the sludge short and causes the increase of gas producing speed and an amount of produced gas. The composition of digestion gas which was produced by the anaerobic digestion with and without the pretreatment consisted of $CH_4$ of 84.5% and $CO_2$ of 15.5%, and $CH_4$ of 84.6% and $CO_2$ of 15.4% respectively ignoring the existance of $N_2$ and $H_2$). There was almost no difference between the digestion gases produced with and without a pretreatment.

Furthermore, viscosity of the sludge after pretreated and neutralized was 15 cp (centipoise) and viscosity was 23 cp without the pretreatment.

EXAMPLE 2

Surplus activated sludge which was remainder upon an urbane sewage treatment was concentrated so that its solid density became 8.6%. After that the sludge was diluted with water, to obtain five parts of sludge of 300 g of which solid density was in range of 1 to 5% and which content of organic material was 65%. Then hydrochloric acid of 35% was added to the parts of sludge, so that pH of the sludge parts was adjusted to 2.0 in a container. During said process the sludge was stirred. The sludge was heated at 100° C. during five minutes. Then, the sludge parts were cooled and sodium hydroxide of 30% was added to the sludge to adjust pH of the sludge to 6.9. Viscosity of those pretreated sludge parts was measured by a revolution viscometer.

The measure results of said experiments are shown in Table 1.

TABLE 1

|  | Solid Density % (wt/wt) | | | | |
| --- | --- | --- | --- | --- | --- |
|  | 1 | 2 | 3 | 4 | 5 |
| With Pretreatment | CP 6 | CP 20 | CP 110 | CP 300 | CP 620 |
| Without Pretreatment | 7 | 26 | 145 | 2,000 | 5,600 |

When the solid density of sludge was under 3%, both values of viscosity as shown in Table 1 were not much different. When, however, the solid density of sludge was over 4%, both values of viscosity were remarkably different.

Usually upon digestion treatment, it is desirable to increase density of sludge for rise of treatment efficiency. However, in a case that the pretreatment of sludge is not provided, the sludge is in a state of paste that the observed value of viscosity of the sludge becomes higher. When liquid with high viscosity is stirred, stirring power of a digestion tank is required in proportion to the value of viscosity. As above mentioned, the invention can decrease the value of viscosity of sludge. Accordingly, the stirring power can be remarkably reduced upon digestion treatment.

EXAMPLE 3

Hydrochloric acid of 4.6 ml, of which density was 35%, was added to surplus activated sludge of 1000 g which was remainder of urban sewage treatment. The solid density of tie sludge was 3% (wt/wt) and the density of organic material was 2.0% (wt/wt). The sludge was stirred and the pH of the sludge was adjusted to 2.0. The sludge was continuously introduced into a stainless hose with an inner surface coated with epoxy resin and soaked in hot water at 98° C. for five minutes. The load of organic material was 32.3 g/l.day. Following that, the treated sludge was thrown into a cylindrical stainless liquefying tank of 10 l provided with a stirrer, a jacket, and an automatic pH controller in a state of said load of organic material. At this time, the stirring speed was 180 rpm and the temperature was 42° C. Sodium hydroxide was added to the sludge, so that pH became 5.8. Continuously liquefying treatment was made for four days. After the liquefying treatment, the sludge was thrown into a cylindrical stainless digestion tank of 20 l provided with a stirrer, a jacket and an automatic pH controller. At this time, the stirring speed was 180 rpm and the temperature was 40° C. Sodium hydroxide was added to the sludge for neutralization, so that pH became 7.4. Anaerobic sludge was added to the sludge and continuous anaerobic digestion treatment was made to produce methane gas for eight days. The remainder produced was introduced into a separator of b 2 l and kept for one day for separating into liquid and digestion sludge containing bacteria producing gas. For comparison, the liquefying and digestion treatments were made without a process of adding acid and heating.

The results of said experiments were as shown in Table 2

TABLE 2

|  | Amount of Produced Digestion Gas ml/g organic material | Content of CH4 in Digestion gas (%) | Rate of Digestion (%) |
| --- | --- | --- | --- |
| Without Pretreatment | 410 | 72 | 55 |
| With Pretreatment | 478 | 74 | 63 |

EXAMPLE 4

Surplus activated sludge which was remainder upon a treatment against water wasted from the food industries was concentrated by a centrifuge so that its solid density became 10%. After that, the sludge was diluted with water, whereby a sludge of 600 g of which solid density was 5% and the content of organic material was 60% was prepared. Then, a little amount of sulfuric acid was added to each part of the divided sludge, which was stirred, so that the sludge parts of which pH were 2, 3 and 4 were adjusted. Each part of sludges was introduced into a stainless autoclave with an inner surface coated with teflon and provided with an inner jacket, an outer jacket and a stirrer. Each part thereof was stirred and heated through entering super-heated steam into the jackets under the conditions shown in Table 3. After the heating treatment, cooling water was entered into the jackets. For each part, a measure was taken of the viscosity by a revolving viscometer. Following that, sodium hydroxide of 30% was added while stirring the sludge parts so that the pH was adjusted to 7.0. These sludge parts were thrown into a digestion tank respectively and anaerobic digestion sludge of 4% (wt/wt) was introduced into the tank as a seed sludge. Gas in a chamber of the tank as replaced with N2 gas. After that, each sludge was stirred at 150 rpm and made digestion treatment at 40° C. For comparison, sludge of 600 g of which solid density was 5% was adjusted to a pH of 6.9 without the pretreatment and added anaerobic sludge as seed sludge. Thus digestion experiment was made.

The results of those experiments are shown in Table 3.

TABLE 3

| pH | Condition of Pretreatment Temperature (°C.) | Heat time (min.) | Observed Viscosity (cp) | Term Required for Digestion (days) | Amount of produced CH2 (l) |
| --- | --- | --- | --- | --- | --- |
| 1.0 | 100 | 5 | 2,000 | 22 | 7.00 |
|  | 60 | 1 | 2,900 | 26 | 6.51 |
|  | 100 | 1 | 2,700 | 24 | 6.80 |
| 2.0 | 170 | 1 | 500 | 20 | 7.01 |
|  | 170 | 20 | 500 | — | — |
|  | 170 | 30 | 500 | 47 | 2.10 |
| 3.0 | 100 | 1 | 2,300 | 25 | 6.75 |
|  | 50 | 1 | 5,000 | 39 | 5.05 |
|  | 60 | 1 | 3,000 | 30 | 6.20 |
| 3.5 | 100 | 5 | 1,500 | 24 | 7.03 |
|  | 160 | 10 | 1,000 | 27 | 6.90 |
|  | 170 | 1 | 1,300 | 23 | 7.00 |
|  | 170 | 20 | 1,100 | 45 | 3.80 |
|  | 60 | 1 | 5,800 | 39 | 5.10 |
| 4.0 | 170 | 20 | 3,000 | 40 | 4.01 |
| 6.8 | Without Pretreatment |  | 6,000 | 42 | 5.04 |

EXAMPLE 5

Domestic garbage with added water was crushed by a mixer, so that slurry of which solid density was 1.5% and which content of organic material was 7.0% was prepared. The slurry was stirred and hydrochloric acid of 2.4 ml of which density was 35% was added to the slurry so that pH was adjusted to 2.0. The slurry was heated in an autoclave. Temperature rose up to 130° C. in five minutes and held at the same for five minutes. After that the slurry was gradually cooled to 95° C. and then taken out from the autoclave and rapidly cooled in a fluid containing water and ice. Following that, sodium hydroxide of 3.0 ml of which denisty was 20% was added to adjust pH to 7.2. The adjusted slurry was thrown into a digestion tank and anaerobic sludge of 2% wt/wt as an added anaerobic seed for anaerobic digestion treatment. The solid density of the slurry was 3.1% and the content of organic material was 1.7%. The slurry was stirred at 200 rpm and underwent digestion treatment at 40° C. For comparison, slurry without the pretreatment was adjusted to a pH of 7.2 with sodium hydroxide and underwent digestion treatment at 40° C. The results of the above mentioned experiments are shown in Table 4.

TABLE 4

| | Observed Viscosity CP | Required Term (days) | Amount of Produced CR, (l) |
|---|---|---|---|
| Digestion with Pretreatment | 3,000 | 31 | 8.1 |
| Digestion without Pretreatment | 5,200 | 42 | 6.5 |

While several preferred embodiments of the present invention have been set forth along with specific examples for purposes of illustration, further embodiments, variations and modifications are contemplated according to the broader aspects of the present invention, all as determined by the spirit and scope of the following claims.

What is claimed is:

1. A method for the treatment of a biochemical waste slurry, with the biochemical waste selected from the group of sewage sludge and garbage, comprising the steps of:
    providing a slurry of the biochemical waste with a solid density greater than 3% by weight;
    adding acid to the slurry to adjust its pH to a value below 3.5;
    heating the slurry having its pH below 3.5 within a temperature range of 60° to 200° C. for a period of 1 to 10 minutes to reduce the viscosity of the slurry;
    thereafter substantially neutralizing the acidity of the slurry to a pH of 5 to 8;
    anaerobically digesting the substantially neutralized slurry at a temperature within the range of 20° to 50° C. for 20 to 40 days with mechanical agitation through the action of methane producing bacteria to convert the slurry to methane and a digested sludge; and
    separating the methane from the digested sludge.

2. The method of claim 1, further including the step of partially neutralizing the acidity of said slurry to a pH between 3.5 and 5 while simultaneously mechanically agitating said slurry at a temperature substantially below 60° C. for a period of time sufficient to substantially reduce the viscosity of said slurry between said steps of heating and neutralizing.

3. The method of claim 1, wherein said slurry is provided with a solid density greater than 5% of said step of providing.

4. The method of claim 3, wherein said step of adding acid adjusts the pH of the slurry to a value within a range of 1 to 3.

5. A method for the treatment of a slurry of biochemical waste, selected from the group of sewage sludge and garbage, comprising the steps of:
    adding acid to the slurry to adjust its pH to a value below 3.5;
    heating the slurry having its pH below 3.5 for a period of 1 to 10 minutes within a temperature range of 60° to 200° C.;
    thereafter substantially neutralizing the acidity of the slurry to a pH of 5 to 8;
    anaerobically digesting the substantially neutralized slurry at a temperature within the range of 20° to 50° C. for 20 to 40 days with mechanical agitation through the action of methane producing bacteria to convert the slurry to methane and a digested sludge; and
    separating the methane from the digested sludge.

6. The method of claim 5, further including the step of partially neutralizing the acidity of said slurry to a pH between 3.5 and 5 while simultaneously mechanically agitating said slurry at a temperature substantially below 60° C. for a period of time sufficient to substantially reduce the viscosity of said slurry, between said steps of heating and neutralizing.

7. The method of claim 5, wherein the step of adding acid adjusts the pH of the slurry to a value within a range of 1 to 3.

8. The method of claim 5, further including heating the slurry having its pH below 3.5 within a temperature range of 60° to 160° C.